United States Patent
Juni

(10) Patent No.: US 7,907,805 B2
(45) Date of Patent: Mar. 15, 2011

(54) OPTICAL WAVEGUIDE FOR TOUCH PANEL AND TOUCH PANEL USING THE SAME

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 12/494,906

(22) Filed: Jun. 30, 2009

(65) Prior Publication Data

US 2010/0001979 A1 Jan. 7, 2010

Related U.S. Application Data

(60) Provisional application No. 61/080,389, filed on Jul. 14, 2008.

(30) Foreign Application Priority Data

Jul. 3, 2008 (JP) ................................. 2008-174582

(51) Int. Cl.
*G02B 6/32* (2006.01)
*G02B 6/10* (2006.01)
*G06F 3/042* (2006.01)

(52) U.S. Cl. ............ 385/33; 385/131; 345/175; 345/176

(58) Field of Classification Search .................... 385/33, 385/129–132; 345/173, 175, 176
See application file for complete search history.

(56) References Cited

U.S. PATENT DOCUMENTS

| 7,099,534 | B2 | 8/2006 | Kato et al. |
| 7,359,594 | B2 | 4/2008 | Nishiizawa et al. |
| 7,509,011 | B2 | 3/2009 | Payne |
| 7,676,131 | B2 | 3/2010 | Luo |
| 7,786,983 | B2 | 8/2010 | Graham |
| 2004/0120672 | A1 | 6/2004 | Chong et al. |
| 2004/0201579 | A1 | 10/2004 | Graham |
| 2005/0058399 | A1 | 3/2005 | Nishizawa et al. |
| 2005/0175306 | A1 | 8/2005 | Chong et al. |

(Continued)

FOREIGN PATENT DOCUMENTS

EP 1980936 A2 10/2008

(Continued)

OTHER PUBLICATIONS

European search Report dated Nov. 9, 2009, issued in correspond European Patent Application No. 09163498.

*Primary Examiner* — Daniel Petkovsek
(74) *Attorney, Agent, or Firm* — Westerman, Hattori, Daniels & Adrian, LLP

(57) ABSTRACT

An optical waveguide for a touch panel which eliminates the need for alignment between the optical waveguide and a lens device, and to provide a touch panel using the same. An optical waveguide for a touch panel is provided in which end surfaces of cores 3A for emitting light beams are positioned in a first side portion of a display screen of a display, and end surfaces of cores 3B for receiving the light beams are positioned in a second side portion of the display screen of the display. Edge portions of an over cladding layer 4 for covering the end surfaces of the cores 3A for emitting the light beams and the end surfaces of the cores 3B for receiving the light beams are formed as lens portions 40A, 40B having spherical lens surfaces 41A, 41B.

3 Claims, 7 Drawing Sheets

U.S. PATENT DOCUMENTS

| | | |
|---|---|---|
| 2005/0201681 A1 | 9/2005 | Payne |
| 2005/0271326 A1 | 12/2005 | Luo |
| 2005/0271983 A1* | 12/2005 | Payne .......................... 430/321 |
| 2007/0258691 A1 | 11/2007 | Charters et al. |
| 2008/0031584 A1 | 2/2008 | Payne |
| 2008/0198144 A1* | 8/2008 | Shimizu et al. ............... 345/175 |
| 2008/0252620 A1* | 10/2008 | Shimizu ........................ 345/176 |
| 2009/0128519 A1* | 5/2009 | Juni .............................. 345/175 |
| 2010/0002995 A1* | 1/2010 | Juni ................................ 385/33 |

FOREIGN PATENT DOCUMENTS

| | | |
|---|---|---|
| JP | 63-21610 A | 1/1988 |
| JP | 2003-004960 A | 1/2003 |
| JP | 2004-295644 A | 10/2004 |
| JP | 2008-203431 A | 9/2008 |
| WO | 2007-128041 A1 | 11/2007 |
| WO | 2008/016618 A2 | 2/2008 |

\* cited by examiner

F I G. 3A
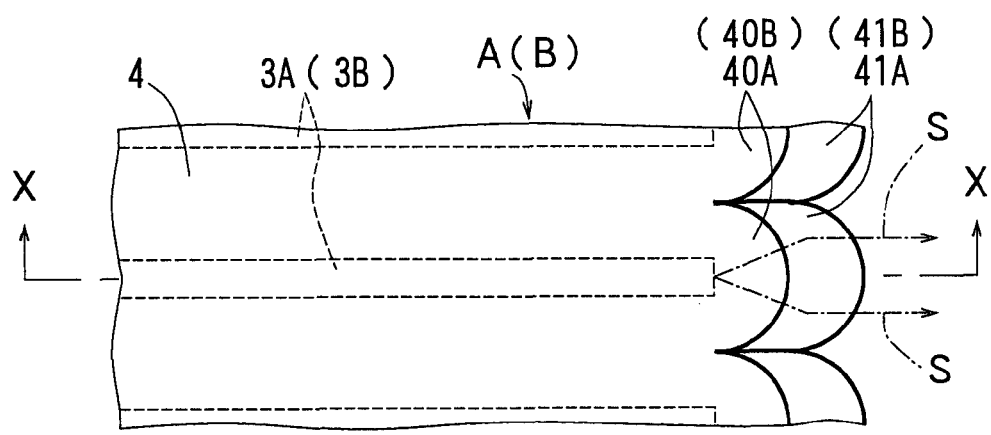
F I G. 3B
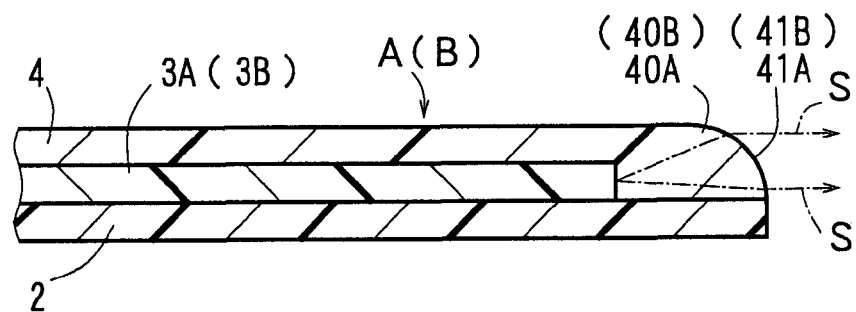

PRIOR ART

US 7,907,805 B2

OPTICAL WAVEGUIDE FOR TOUCH PANEL AND TOUCH PANEL USING THE SAME

RELATED APPLICATIONS

This application claims the benefit of U.S. Provisional Application No. 61/080,389, filed Jul. 14, 2008, which is hereby incorporated by reference.

BACKGROUND OF THE INVENTION

1. Field of the Invention

The present invention relates to an optical waveguide for a touch panel and a touch panel using the same.

2. Description of the Related Art

A touch panel is an input device for operating an apparatus by directly touching a display screen of a liquid crystal display device or the like with a finger, a purpose-built stylus or the like. The touch panel includes a display which displays operation details and the like, and a detection means which detects the position (coordinates) of a portion of the display screen of the display touched with the finger or the like. Information indicating the touch position detected by the detection means is sent in the form of a signal to the apparatus, which in turn performs an operation and the like displayed on the touch position. Examples of the apparatus employing such a touch panel include ATMs in banking facilities, ticket vending machines in stations, portable game machines, and the like.

A detection means employing an optical waveguide is proposed as the detection means for detecting the portion touched with the finger and the like on the above-mentioned touch panel (see, for example, US Patent Application Laid-Open No. 2004/0201579A1). Specifically, the touch panel includes optical waveguides provided around a periphery of a display screen of a rectangular display. The touch panel is configured such that a multiplicity of light beams parallel to the display screen of the display are emitted from a light-emitting portion of a light-emitting optical waveguide provided on a first side portion of the display screen of the display toward a second side portion, and such that the light beams enter a light-receiving portion of a light-receiving optical waveguide provided on a second side portion. These optical waveguides cause the emitted light beams to travel in a lattice form on the display screen of the display. When a portion of the display screen of the display is touched with a finger in this state, the finger blocks some of the emitted light beams. Thus, the light-receiving optical waveguide senses a light blocked portion, whereby the position of the above-mentioned portion touched with the finger is detected.

On the other hand, the light beams emitted from an optical waveguide directly into the air diverge radially. In this state, optical transmission efficiency is low, and it is impossible to accurately detect the above-mentioned position of the portion touched with the finger. To solve the problem, an optical transmission device has been proposed in which the optical transmission efficiency is enhanced (see, for example, Japanese Patent Application Laid-Open No. 2003-4960). This conventional optical transmission device is schematically shown in FIGS. 7A and 7B. This optical transmission device includes an optical waveguide 100 and a lens device 20. The above-mentioned lens device 20 includes a mounting surface portion 21 for placing the optical waveguide 100 thereon, and a thick strip-shaped lens 22 formed to protrude from a front edge portion of this mounting surface portion 21. This strip-shaped lens 22 has a lens surface (a right-hand surface shown) of an arcuate configuration as seen in sectional side view so as to bulge outwardly (with reference to FIG. 7B). The above-mentioned optical waveguide 100 includes an under cladding layer 12, cores 13, and an over cladding layer 14 which are stacked in the order named. Each of the above-mentioned cores 13 has a front end portion formed as a lens portion 130 of a semicircular configuration as seen in plan view and exposed to the outside. This lens portion 130 has a lens surface (a front end surface) of an arcuate configuration as seen in plan view so as to bulge outwardly (with reference to FIG. 7A). In such an optical transmission device, when light beams S emitted from each of the cores 13 pass through the lens portion 130 provided in the front end portion of each of the cores 13, the light beams S are restrained from diverging in a direction parallel to the mounting surface of the above-mentioned mounting surface portion 21 (a horizontal direction) by refraction through the lens portion 130 of the semi-circular configuration as seen in plan view. Thereafter, when the light beams S pass through the strip-shaped lens 22 of the above-mentioned lens device 20, the light beams S are restrained from diverging in a direction orthogonal to the above-mentioned mounting surface portion 21 (a vertical direction) by refraction through the strip-shaped lens 22 of the arcuate configuration as seen in sectional side view. The use of such an optical transmission device with enhanced optical transmission efficiency as an optical waveguide device for a touch panel enables the touch panel to accurately detect the position of the portion touched with the finger.

In the above-mentioned conventional optical transmission device, however, it is necessary to bond the optical waveguide 100 and the lens device 20 to each other, with accurate alignment achieved between the lens portion 130 provided in the front end portion of each of the cores 13 and the strip-shaped lens 22 of the lens device 20. Unless the alignment is performed accurately, the divergence of the light beams S is not appropriately restrained on the light-emitting side, and, consequently, the position of the portion of the display screen of the display touched with the finger cannot be detected accurately. However, the accurate alignment requires precision and is hence difficult. It is labor- and time-consuming to achieve the accurate alignment.

DISCLOSURE OF THE INVENTION

In view of the foregoing, it is an object of the present invention to provide an optical waveguide for a touch panel which eliminates the need for alignment between the optical waveguide and a lens device, and to provide a touch panel using the same.

To accomplish the above-mentioned object, a first aspect of the present invention is intended for an optical waveguide for a touch panel, comprising: cores; and an over cladding layer formed so as to cover the cores, the optical waveguide being provided along a peripheral portion of a display screen of a display of the touch panel, the cores including a light-emitting core for emitting light beams and having an end surface positioned in a first side portion of the display screen of said display, said over cladding layer having an edge portion formed so as to cover the end surface of said light-emitting core, the edge portion of the over cladding layer being formed as a lens portion, the lens portion having a lens surface of a spherical configuration.

A second aspect of the present invention is intended for a touch panel comprising the above-mentioned optical waveguide for the touch panel, the optical waveguide being provided along a peripheral portion of a display screen of a display of the touch panel, wherein a light-emitting core for emitting light beams has an end surface positioned in a first side portion of the display screen of said display, and a light-receiving core for receiving the emitted light beams has an end surface positioned in a second side portion of the display screen of said display.

The present inventor has discovered the idea of forming the edge portion per se of the over cladding layer covering the end surface of each of the cores as the lens portion to solve the above-mentioned problem. Since the cores and the over cladding layer are originally integral, this allows the optical waveguide for the touch panel according to the present invention to achieve accurate alignment between the end surface of each of the cores and the lens portion provided in the edge portion of the over cladding layer when the over cladding layer is formed. Further, the present inventor has made studies of the configuration of the lens portion and the like. As a result, the present inventor has found that, when the lens surface of the lens portion is of a spherical configuration, the light beams emitted from the end surface of each of the cores are restrained from diverging in a horizontal direction (leftward and rightward directions) and in a vertical direction (upward and downward directions) relative to the direction of travel of the light beams by refraction resulting from the spherical configuration of the above-mentioned lens surface of the lens portion during the passage through the above-mentioned lens portion provided in the edge portion of the over cladding layer in front of each of the cores without the need to form the end portion of each of the cores as a lens portion. Thus, the present inventor has attained the present invention.

In the optical waveguide for the touch panel according to the present invention, the term "lens surface" of the lens portion refers to a surface of the lens portion that performs a lens function (refraction). The term "spherical configuration" of the lens surface refers to a curved surface that performs the above-mentioned refraction resulting from the lens surface configuration, and is meant to include not only a curved surface at the surface of a perfect sphere but also a curved surface at the surface of a ball-shaped body (for example, an oval sphere) obtained by the deformation of the perfect sphere. The term "spherical" generally means part or the whole of the surface of a hemisphere obtained by halving a perfect sphere or the above-mentioned ball-shaped body.

In the optical waveguide for the touch panel according to the present invention, the end surface of the light-emitting core is covered with the edge portion of the over cladding layer, and the edge portion of the over cladding layer is formed as the lens portion. Thus, the optical waveguide for the touch panel according to the present invention is capable of achieving automatic accurate alignment between the end surface of the core and the lens portion provided in the edge portion of the over cladding layer when the over cladding layer is formed. This eliminates the need for the process of aligning the end surface of the core and the lens portion provided in the edge portion of the over cladding layer with each other to improve productivity. Additionally, since the lens surface of the above-mentioned lens portion is of a spherical configuration, the light beams on the light-emitting side are restrained from diverging in a horizontal direction and in a vertical direction relative to the direction of travel of the light beams by refraction resulting from the spherical configuration of the lens surface. As a result, efficiency of optical transmission between the light-emitting core and the light-receiving core is enhanced. This achieves the accurate detection of the position of a finger having touched the display screen of the display in the touch panel.

Further, when the light-receiving core for receiving the emitted light beams has the end surface positioned in the second side portion of the display screen of said display, the over cladding layer has an edge portion formed so as to cover the end surface of the light-receiving core, the edge portion of the over cladding layer is formed as a lens portion, and the lens portion has a lens surface of a spherical configuration, then the light beams entering the above-mentioned lens portion provided in the edge portion of the over cladding layer on the light-receiving side are further narrowed down and converged in a horizontal direction and in a vertical direction relative to the direction of travel of the light beams by refraction resulting from the spherical configuration of the above-mentioned lens surface of the lens portion, and enter the end surface of the core. In other words, on the light-receiving side, the light beams emitted from the light-emitting side are allowed to enter the spherical lens surface of the lens portion which has a wide area, and also to enter the end surface of the core while being further narrowed down and converged. This enhances the optical transmission efficiency without the need to emit the narrowed light beams from the lens portion on the light-emitting side so as to cause the converged light beams to enter the end surface of the light-receiving core. This achieves the accurate detection of the position of a finger having touched the display screen of the display in the touch panel.

The touch panel according to the present invention includes the above-mentioned optical waveguide for the touch panel. Thus, the light beams emitted from the end surface of the core is restrained from diverging. This achieves the accurate detection of the position of a finger having touched the display screen of the display.

BRIEF DESCRIPTION OF THE DRAWINGS

FIG. 3A is a plan view schematically showing the emission of light beams from the above-mentioned optical waveguide for the touch panel.

FIG. 3B is a sectional view taken along the line X-X of FIG. 3A.

DETAILED DESCRIPTION OF THE INVENTION

Next, embodiments according to the present invention will now be described in detail with reference to the drawings.

Figure 1A:
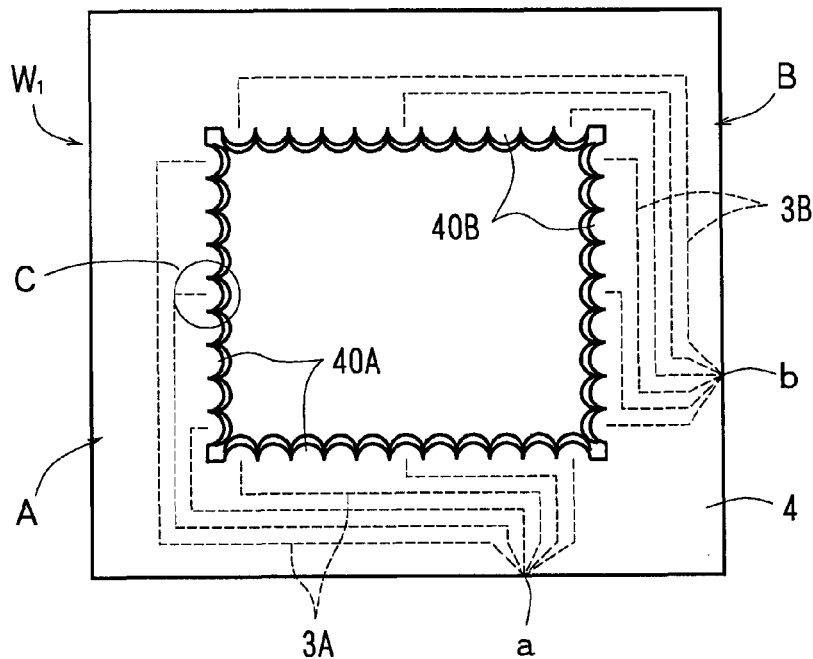
FIG. 1A is a plan view schematically showing an optical waveguide for a touch panel according to a first embodiment of the present invention.
Figure 1B:
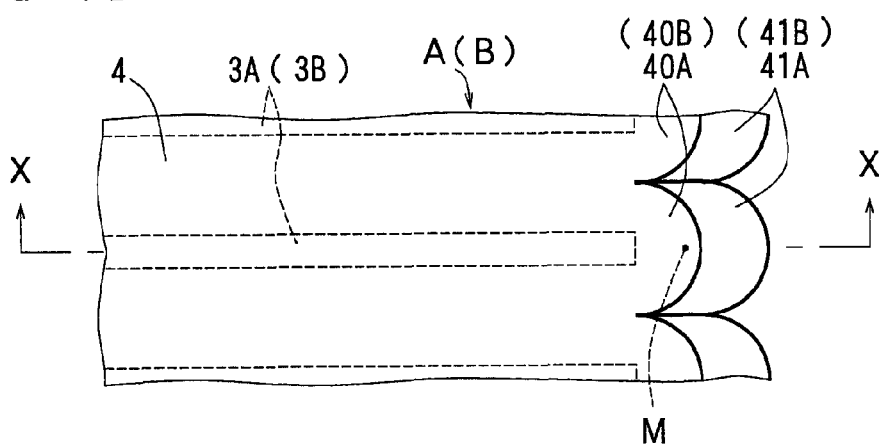
FIG. 1B is an enlarged view of an end portion of a core enclosed with a circle C of FIG. 1A.
Figure 1C:
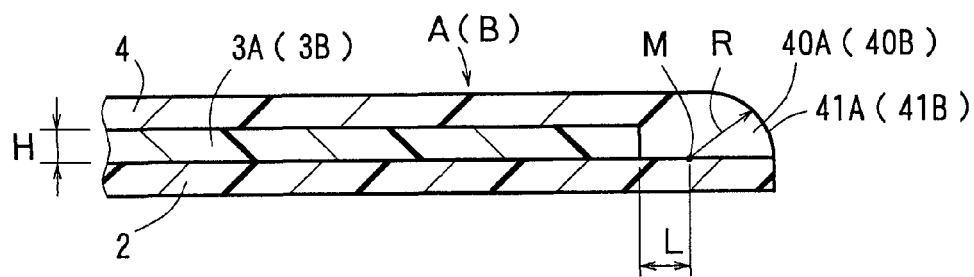
FIG. 1C is a sectional view taken along the line X-X of FIG. 1B.

FIGS. 1A to 1C show an optical waveguide for a touch panel according to a first embodiment of the present invention. The optical waveguide $W_1$ for the touch panel according to this embodiment is in the form of a rectangular frame as seen in plan view, as shown in FIG. 1A. One L-shaped portion constituting the rectangular frame is a light-emitting optical waveguide portion A, and the other L-shaped portion is a light-receiving optical waveguide portion B. The above-mentioned optical waveguide $W_1$ for the touch panel includes an under cladding layer (body) 2 in the form of a rectangular frame, and a plurality of cores 3A, 3B serving as a passageway for light and formed on predetermined portions of the surface of the under cladding layer 2, the plurality of cores 3A, 3B being patterned to extend from predetermined portions a and b provided at outer end edges of the above-mentioned respective L-shaped portions to inner end edge portions of the L-shaped portions [on the display screen side of a display 11 (see FIG. 2)] and to be arranged in a parallel, equally spaced relationship. The number of cores 3A formed in the light-emitting optical waveguide portion A is equal to the number of cores 3B formed in the light-receiving optical waveguide portion B. Further, end surfaces of the light-emitting cores 3A are in face-to-face relationship with end surfaces of the light-receiving cores 3B. As shown in FIG. 1B (an enlarged view of a circular portion C of FIG. 1A) and in FIG. 1C (a sectional view taken along the line X-X of FIG. 1B), an over cladding layer 4 is formed on the surface of the above-mentioned under cladding layer 2 so as to cover the above-mentioned cores 3A, 3B. In this embodiment, edge portions of the over cladding layer 4 are extended so as to cover the end surfaces of the light-emitting and light-receiving cores 3A and 3B which are positioned in the inner end edge portions of the above-mentioned L-shaped portions. The extended edge portions of the over cladding layer 4 are formed as lens portions 40A, 40B having lens surfaces 41A, 41B of a spherical configuration. The cores 3A, 3B, the lens portions 40A, 40B, and the lens surfaces 41A, 41B are identical in shape and the like with each other, and are hence illustrated in FIGS. 1B and 1C as those on the light-emitting side and on the light-receiving side in conjunction with each other. In FIG. 1A, the cores 3A, 3B are indicated by broken lines, and the thickness of the broken lines indicates the thickness of the cores 3A, 3B. Also, the number of cores 3A, 3B are shown as abbreviated.

Figure 2:
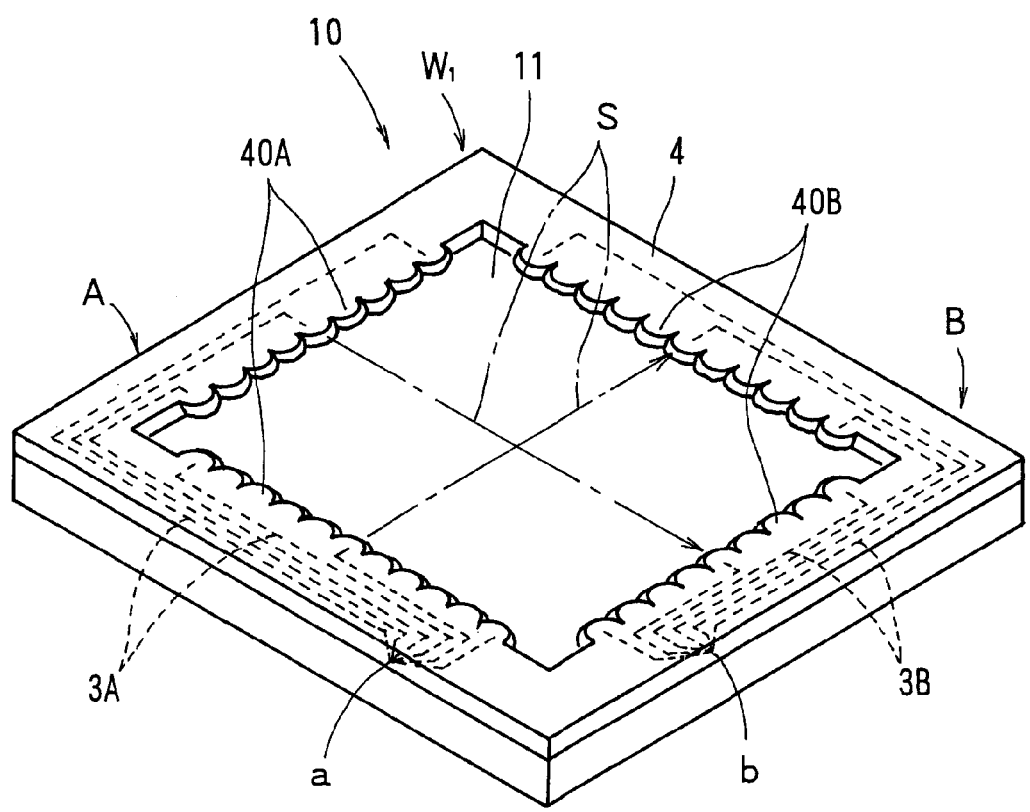
FIG. 2 is a perspective view schematically showing a touch panel using the above-mentioned optical waveguide for the touch panel.

As shown in FIG. 2, the above-mentioned optical waveguide $W_1$ for the touch panel in the form of the rectangular frame is provided along the rectangular shape of the periphery of the display screen of the rectangular display 11 of a touch panel 10 so as to surround the display screen of the rectangular display 11. In the predetermined portion a provided at the outer end edge of the above-mentioned light-emitting optical waveguide portion A, a light source (not shown) such as a light-emitting element and the like is connected to the cores 3A. In the predetermined portion b provided at the outer end edge of the above-mentioned light-receiving optical waveguide portion B, a detector (not shown) such as a light-receiving element and the like is connected to the cores 3B. In FIG. 2 as in FIG. 1A, the cores 3A, 3B are indicated by broken lines, and the thickness of the broken lines indicates the thickness of the cores 3A, 3B. Also, the number of cores 3A, 3B are shown as abbreviated. Only some of a multiplicity of light beams S are shown in FIG. 2 for ease of understanding.

In the light-emitting optical waveguide portion A, as shown in FIG. 3A (a plan view) and in FIG. 3B (a sectional view taken along the line X-X of FIG. 3A), the light beams S emitted from the end surface of a core 3A pass through a corresponding one of the above-mentioned lens portions 40A provided in the edge portion of the over cladding layer 4 which is in front of the core 3A. During the passage, the above-mentioned light beams S are restrained from diverging in a horizontal direction (with reference to FIG. 3A) and in a vertical direction (with reference to FIG. 3B) relative to the direction of travel of the light beams S by refraction through the above-mentioned lens portion 40A resulting from the spherical configuration of the above-mentioned lens surface 41A. Then, the light beams S exit from the above-mentioned spherical lens surface 41A to travel along the display screen of the above-mentioned display 11 (with reference to FIG. 2).

In the light-receiving optical waveguide portion B, on the other hand, the light beams S having traveled over the display screen of the above-mentioned display 11 (with reference to FIG. 2) travel in a direction opposite from that shown in FIGS. 3A and 3B. Specifically, the light beams S enter the spherical lens surface (41B) of a lens portion (40B) provided in the edge portion of the over cladding layer 4, and are further narrowed down and converged in a horizontal direction and in a vertical direction relative to the direction of travel of the light beams S by refraction through the lens portion (40B) resulting from the spherical configuration of the above-mentioned lens surface (41B). Then, while being converged, the light beams S enter the end surface of a core (3B), and travel toward the interior of the core (3B).

Since such optical transmission is done in the optical waveguide $W_1$ for the touch panel shown in FIG. 2, the light beams S travel in a lattice form on the display screen of the display 11 of the touch panel 10 as shown in FIG. 2 while the divergence of the light beams S in the horizontal direction and in the vertical direction relative to the direction of travel of the light beams S is suppressed (only some of the light beams S forming the lattice are shown in FIG. 2 for ease of understanding). Thus, when the display screen of the display 11 is touched with a finger in this state, the position of a portion touched with the above-mentioned finger is accurately detected.

For the display of more information about manipulations and the like on the display screen of the display in the above-mentioned touch panel 10, it is necessary to make the detectability of the finger position more precise. In this case, during the above-mentioned optical transmission, the suppression of the divergence of the light beams S emitted from the lens portions 40A is made more appropriate, and the convergence of the light beams S through the lens portions 40B is also made more appropriate, whereby optical transmission efficiency is further enhanced. To this end, the dimensions of the above-mentioned lens portions 40A, 40B are determined as follows. Specifically, with reference to FIGS. 1A to 1C, when the height (H) of the cores 3A, 3B is within a range given by the expression (a) to be described below, a distance (L) from the end surfaces of the above-mentioned cores 3A, 3B to the center of curvature M of the spherical lens surfaces 41A, 41B of the above-mentioned lens portions 40A, 40B is within a range given by the expression (b) to be described below, and the radius of curvature (R) of the above-mentioned spherical lens surfaces 41A, 41B is within a range given by the expression (c) to be described below. The following expressions (a) to (c) represent ranges obtained by the present inventor after repeated experiments.

$10\ \mu m \leq H \leq 100\ \mu m$ (a)

$1000\ \mu m < L < 20000\ \mu m$ (b)

$250\ \mu m < R < 8000\ \mu m$ (c)

This makes the suppression of the divergence of the light beams S emitted from the spherical lens surfaces 41A of the lens portions 40A more appropriate in the light-emitting optical waveguide portion A with reference to FIGS. 3A and 3B to cause the emitted light beams S to become parallel light beams or close to parallel light beams, that is, light beams neither spreading too wide nor narrowing down too much. As a result, in the light-receiving optical waveguide portion (B), the area of a light-receiving region in the lens portions (40B) is made more appropriate. In the light-receiving optical waveguide portion (B), the light beams S incident on the spherical lens surfaces (41B) of the lens portions (40B) are converged more appropriately. This allows all or most of the incident light beams S to enter the end surfaces of the cores (3B).

Additionally, the following conditions are preferably determined from the viewpoints of further enhancing the above-mentioned optical transmission efficiency and making the detectability of the finger position on the touch panel 10 much more precise. Specifically, with reference to FIGS. 1A to 1C, when the height (H) of the cores 3A, 3B is within the range given by the expression (a) described above, the distance (L) from the end surfaces of the above-mentioned cores 3A, 3B to the center of curvature M of the spherical lens surfaces 41A, 41B of the above-mentioned lens portions 40A, 40B is preferably within a range given by the expression ($b_1$) to be described below, and the radius of curvature (R) of the above-mentioned spherical lens surfaces 41A, 41B is preferably within a range given by the expression ($c_1$) to be described below.

$$1500 \text{ μm} < L < 10000 \text{ μm} \tag{$b_1$}$$

$$300 \text{ μm} < R < 7500 \text{ μm} \tag{$c_1$}$$

The dimensions and the like of the above-mentioned optical waveguide $W_1$ for the touch panel in the form of the rectangular frame may be determined to conform to the size of the display 11 of the touch panel 10, as shown in FIG. 2. For example, the vertical and horizontal lengths of the frame are on the order of 30 to 300 mm, and the frame width is on the order of 50 μm to 2 mm. The number of cores 3A emitting the light beams S (cores 3B receiving the light beams S) may be determined according to the number of manipulation details and the like to be displayed on the display screen of the display 11, and is, for example, on the order of 20 to 100.

Next, an example of a manufacturing method of the above-mentioned optical waveguide $W_1$ for the touch panel will be described. FIGS. 4A to 4D and FIGS. 5A to 5D to which reference is made in this description show the manufacturing method mainly about the opposed lens portions 40A, 40B shown in FIGS. 1A to 1C and a peripheral portion thereof.

First, a base 1 of a flat shape (with reference to FIG. 4A) for use in the manufacture of the above-mentioned optical waveguide $W_1$ for the touch panel is prepared. Examples of a material for the formation of the base 1 include glass, quartz, silicon, resins, metals and the like. The thickness of the base 1 is, for example, in the range of 20 μm to 5 mm.

Figure 4A:
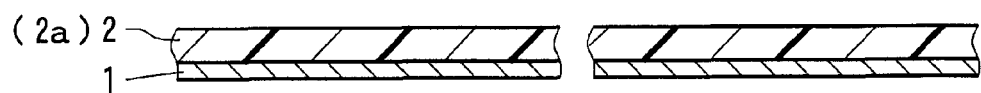
FIGS. 4A to 4D are illustrations schematically showing a manufacturing method of the above-mentioned optical waveguide for the touch panel.

Then, as shown in FIG. 4A, a varnish prepared by dissolving a photosensitive resin in a solvent, which serves as a material for the formation of the under cladding layer 2, is applied to a predetermined region on the above-mentioned base 1. Examples of the above-mentioned photosensitive resin include a photosensitive epoxy resin, and the like. The application of the above-mentioned varnish is achieved, for example, by a spin coating method, a dipping method, a casting method, an injection method, an ink jet method and the like. Then, the varnish is dried by a heating treatment at 50 to 120° C. for 10 to 30 minutes. This provides a photosensitive resin layer 2a which is to be formed into the under cladding layer 2.

Next, the above-mentioned photosensitive resin layer 2a is exposed to irradiation light. Examples of the irradiation light for the above-mentioned exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically in the range of 10 to 10000 mJ/cm$^2$.

After the above-mentioned exposure, a heating treatment is performed to complete a photoreaction. This heating treatment is typically performed at 80 to 250° C. for 10 seconds to two hours. This causes the above-mentioned photosensitive resin layer 2a to be formed into the under cladding layer 2. The thickness of the under cladding layer 2 (the photosensitive resin layer 2a) is typically in the range of 1 to 50 μm.

Figure 4B:
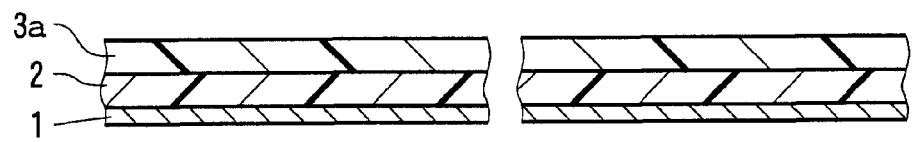

Then, as shown in FIG. 4B, a photosensitive resin layer 3a to be formed into the cores 3A, 3B is formed on the surface of the above-mentioned under cladding layer 2. The formation of this photosensitive resin layer 3a is carried out in a manner similar to the method for the formation of the photosensitive resin layer 2a formed into the under cladding layer 2 described with reference to FIG. 4A. A material for the formation of the cores 3A, 3B used herein is a material having a refractive index greater than that of the materials for the formation of the above-mentioned under cladding layer 2 and the over cladding layer 4 (with reference to FIG. 1C) to be described later. The adjustment of this refractive index may be made, for example, by adjusting the selection of the types of the materials for the formation of the above-mentioned under cladding layer 2, the cores 3A, 3B and the over cladding layer 4, and the composition ratio thereof.

Next, an exposure mask formed with an opening pattern corresponding to the pattern of the cores 3A, 3B is placed over the above-mentioned photosensitive resin layer 3a. Then, the above-mentioned photosensitive resin layer 3a is exposed to irradiation light through the exposure mask. Thereafter, a heating treatment is performed. The exposure and the heating treatment are carried out in a manner similar to those in the method for the formation of the under cladding layer 2 described with reference to FIG. 4A.

Figure 4C:
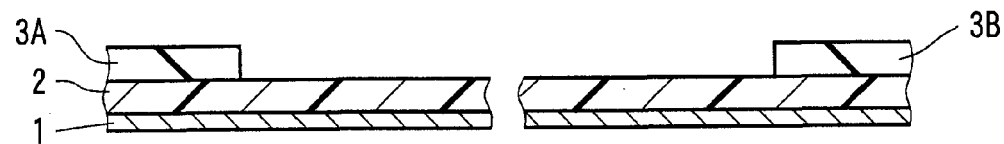

Subsequently, development is performed using a developing solution to dissolve away an unexposed portion of the above-mentioned photosensitive resin layer 3a (with reference to FIG. 4B), thereby forming the photosensitive resin layer 3a remaining on the under cladding layer 2 into the pattern of the cores 3A, 3B, as shown in FIG. 4C. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution remaining on the surface and the like of the remaining photosensitive resin layer 3a formed in the pattern of the cores 3A, 3B is removed by a heating treatment. This heating treatment is typically performed at 80 to 120° C. for 10 to 30 minutes. This causes the remaining photosensitive resin layer 3a formed in the pattern of the above-mentioned cores 3A, 3B to be formed into the cores 3A, 3B. The front end surfaces of the cores 3A, 3B are typically formed as flat surfaces orthogonal to the surface of the under cladding layer 2 so that the front end surfaces of the light-emitting cores 3A and the light-receiving cores 3B are in face-to-face relationship with each other. The thickness of the cores 3A, 3B (the photosensitive resin layer 3a) is typically in the range of 10 to 100 μm, and the width of the cores 3A, 3B is typically in the range of 8 to 50 μm.

Figure 4D:
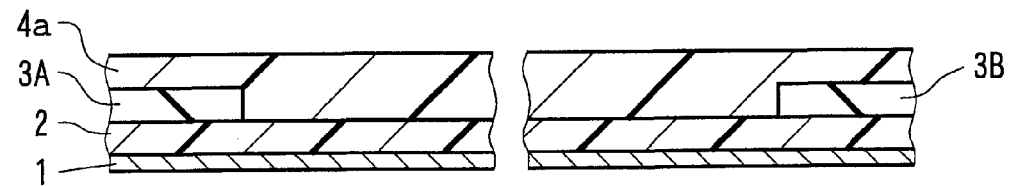

Then, as shown in FIG. 4D, a photosensitive resin to be formed into the over cladding layer 4 is applied to the surface of the above-mentioned under cladding layer 2 so as to cover the cores 3A, 3B to form a photosensitive resin layer (unhardened) 4a. An example of the photosensitive resin to be formed into this over cladding layer 4 includes a photosensitive resin similar to that of the above-mentioned under cladding layer 2.

Figure 5A:
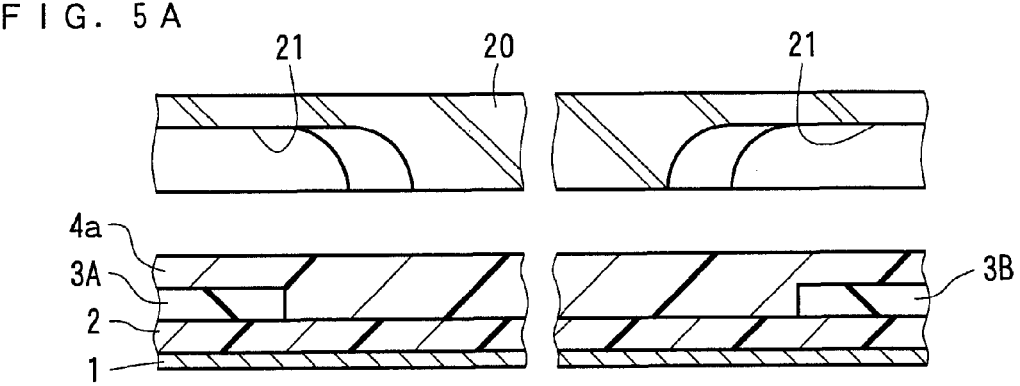
FIGS. 5A to 5D are illustrations schematically showing a continuation of the manufacturing method of the above-mentioned optical waveguide for the touch panel.
Figure 5B:
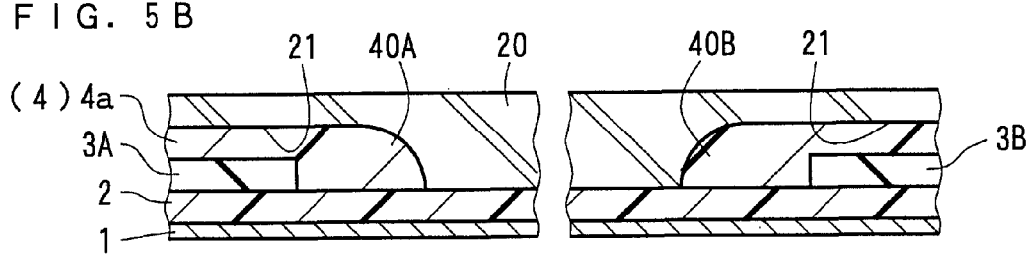
Figure 5C:
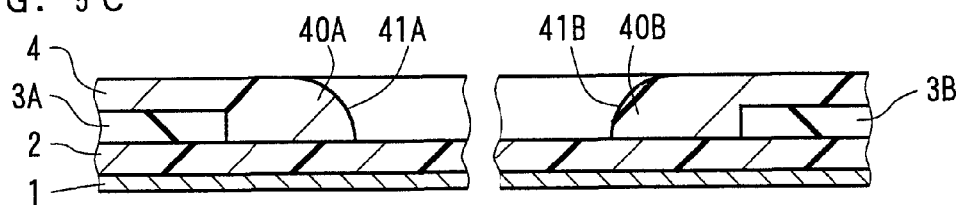

Then, as shown in FIG. 5A, a molding die 20 for press molding the over cladding layer 4 into the rectangular frame shape. This molding die 20 is made of a material (for example, quartz) permeable to irradiation light such as ultraviolet light and the like, and is formed with a recessed portion having a die surface 21 complementary in shape to the surface of the over cladding layer 4 including the above-mentioned lens portions 40A, 40B. Then, as shown in FIG. 5B, the molding die 20 is pressed against the above-mentioned photosensitive resin layer 4a so that the die surface (the recessed portion) 21 of the above-mentioned molding die 20 is positioned in a predetermined position relative to the above-mentioned cores 3A, 3B, to mold the photosensitive resin layer 4a into the shape of the over cladding layer 4. Next, in that state, exposure to irradiation light such as ultraviolet light and the like is performed through the above-mentioned molding die 20, and a heating treatment is thereafter performed. The exposure and the heating treatment are carried out in a manner similar to those in the method for the formation of the under cladding layer 2 described with reference to FIG. 4A. Thereafter, as shown in FIG. 5C, the molding die 20 is removed. This provides the over cladding layer 4 in the form of the rectangular frame and formed with the lens portions 40A, 40B. The thickness of the over cladding layer 4 is typically in the range of 50 to 2000 μm.

The over cladding layer 4 (including the lens portions 40A, 40B) is formed in this manner. Thus, the cores 3A, 3B and the over cladding layer 4 are integral with each other, with the end surfaces of the cores 3A, 3B and the lens portions 40A, 40B in front thereof positioned relative to each other, when the over cladding layer 4 is formed. When the under cladding layer 2 and the over cladding layer 4 are made of the same material, the under cladding layer 2 and the over cladding layer 4 are integrated together at the contact portions thereof.

Figure 5D:
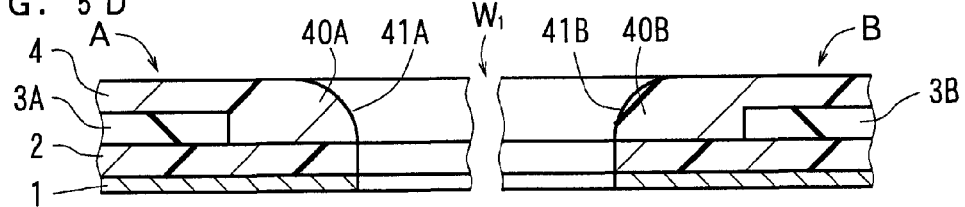

Thereafter, as shown in FIG. 5D, the under cladding layer 2 and the like together with the base 1 are cut into the rectangular frame shape by punching using a blade and the like. Thus, the optical waveguide $W_1$ for the touch panel in the form of the rectangular frame and including the under cladding layer 2, the cores 3A, 3B, and the over cladding layer 4 described above is manufactured on the surface of the base 1. This optical waveguide $W_1$ for the touch panel is used after being removed from the above-mentioned base 1 (with reference to FIG. 1C).

Figure 6A:
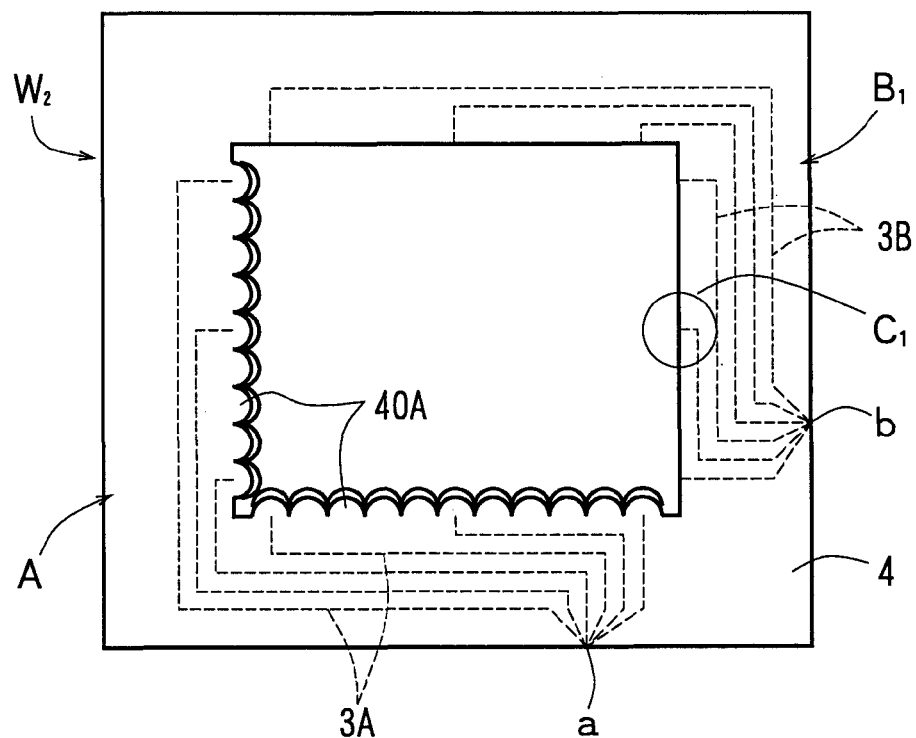
FIG. 6A is a plan view schematically showing an optical waveguide for a touch panel according to a second embodiment of the present invention.
Figure 6B:
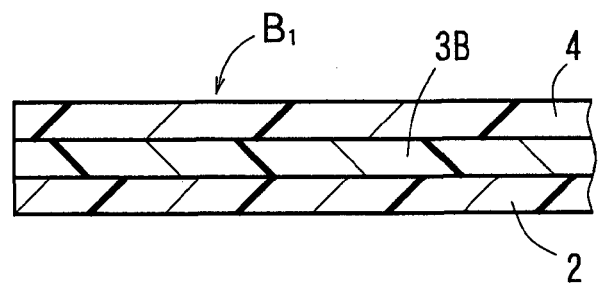
FIG. 6B is an enlarged view of an end portion of a light-receiving core enclosed with a circle $C_1$ of FIG. 6A.
Figure 7A:
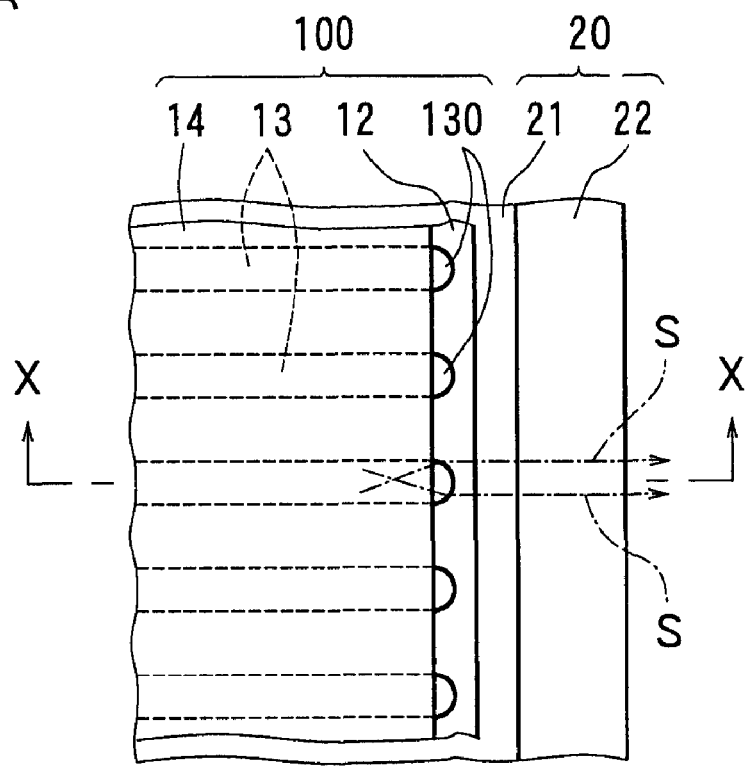
FIG. 7A is a plan view schematically showing a conventional optical transmission device.
Figure 7B:
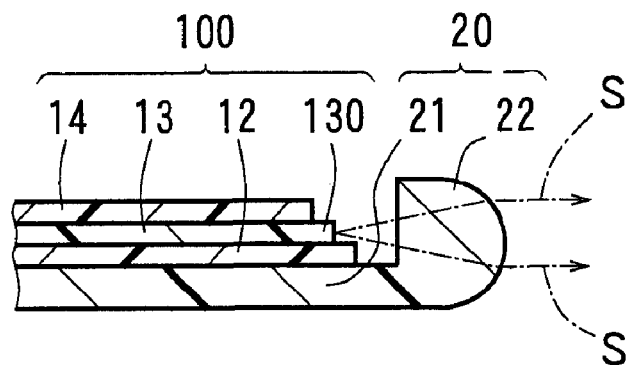
FIG. 7B is a sectional view taken along the line X-X of FIG. 7A.

FIGS. 6A and 6B show an optical waveguide for a touch panel according to a second embodiment of the present invention. The optical waveguide $W_2$ for the touch panel according to this embodiment is such that a light-receiving optical waveguide portion $B_1$ is not formed with the above-mentioned lens portions 40B (with reference to FIGS. 1A to 1C) so that the end surfaces of the light-receiving cores 3B are exposed or uncovered. Other parts are similar to those of the above-mentioned first embodiment, and like reference numerals and characters are used to designate similar parts.

In this embodiment, the light beams S restrained from diverging in a horizontal direction and in a vertical direction relative to the direction of travel of the light beams S are emitted from the lens portions 40A of the light-emitting optical waveguide portion A, as in the above-mentioned first embodiment. From the viewpoint of enhancing the optical transmission efficiency, it is preferable in this embodiment that the light beams narrowed down by the light-emitting lens portions 40A are emitted so that the light beams enter the end surfaces of the light-receiving cores 3B while being converged. Also, in this embodiment, the position of a finger having touched the display screen of the display 11 is accurately detected in the touch panel 10 (with reference to FIG. 2).

In the above-mentioned embodiments, the photosensitive resin is used to form the under cladding layer 2. In place of this, however, a resin film functioning as the under cladding layer 2 may be prepared and used as it is as the under cladding layer 2. Alternatively, in place of the under cladding layer 2, a substrate and the like with a metal film (a metal material) or a metal thin film (a metal material) formed on the surface thereof may be used as a body having a surface on which the cores 3A, 3B are to be formed.

In the above-mentioned embodiments, the optical waveguides $W_1$ and $W_2$ for the touch panel are in the form of the rectangular frame. However, the two L-shaped optical waveguide portions A and B($B_1$) constituting the optical waveguides $W_1$ and $W_2$ for the touch panel in the form of the rectangular frame may be separate from each other. A manufacturing method thereof may include the step of cutting into two L-shaped configurations in place of the step of cutting into the above-mentioned rectangular frame shape.

Also, in the above-mentioned embodiments, the optical waveguides $W_1$ and $W_2$ for the touch panel are used after being removed from the above-mentioned base 1. However, the optical waveguides $W_1$ and $W_2$ for the touch panel may be used while being formed on the surface of the base 1 without being removed therefrom.

Next, examples of the present invention will be described. It should be noted that the present invention is not limited to the examples.

EXAMPLES

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (I), 40 parts by weight of 3',4'-epoxycyclohexyl methyl-3,4-epoxycyclohexane carboxylate which is an alicyclic epoxy resin (CELLOXIDE 2021P manufactured by Daicel Chemical Industries, Ltd.) (component B), 25 parts by weight of (3'4'-epoxycyclohexane)methyl-3',4'-epoxycyclohexyl-carboxylate (CELLOXIDE 2081 manufactured by Daicel Chemical Industries, Ltd.) (component C), and 2 parts by weight of a 50% propione carbonate solution of 4,4'-bis[di(β-hydroxyethoxy phenylsulfinio)phenyl-sulfide-bis-hexafluoroantimonate (component D).

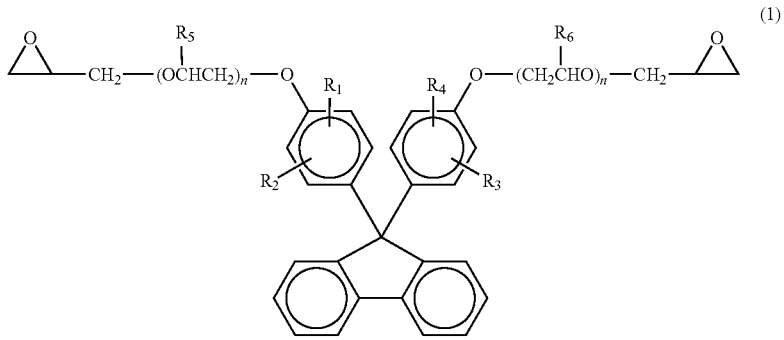

wherein $R_1$ to $R_6$ are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in 28 parts by weight of ethyl lactate.

Production of Optical Waveguide for Touch Panel

The material for the formation of the above-mentioned under cladding layer was applied to the surface of a polyethylene naphthalate (PEN) film [160 mm×160 mm×188 μm (thick)] with an applicator. Thereafter, exposure by the use of irradiation with ultraviolet light at 2000 mJ/cm² was performed. Subsequently, a heating treatment was performed at 100° C. for 15 minutes to form the under cladding layer. The thickness of this under cladding layer was 20 μm when measured with a contact-type film thickness meter. The refractive index of this under cladding layer at a wavelength of 830 nm was 1.542.

Then, the material for the formation of the above-mentioned cores was applied to the surface of the above-mentioned under cladding layer with an applicator. Thereafter, a drying process was performed at 100° C. for 15 minutes. Next, a synthetic quartz chrome mask (exposure mask) formed with an opening pattern identical in shape with the pattern of the cores was placed over the resulting core material. Then, exposure by the use of irradiation with ultraviolet light at 4000 mJ/cm² was performed by a proximity exposure method from over the mask. Thereafter, a heating treatment was performed at 80° C. for 15 minutes. Next, development was carried out using an aqueous solution of γ-butyrolactone to dissolve away an unexposed portion. Thereafter, a heating treatment was performed at 120° C. for 30 minutes to form the cores. The dimensions of the cores in cross section were shown in Table 1 below (Examples 1 to 3). The above-mentioned dimensions were measured with an SEM (electron microscope). The refractive index of the cores at a wavelength of 830 nm was 1.588.

Next, molding dies made of quartz for the formation of the over cladding layer were prepared so as to conform to the radius of curvature (R) of spherical lens surfaces of lens portions shown in Table 1 below (Examples 1 to 3). Each of these molding dies was formed with a recessed portion defined by a die surface complementary in shape to the surface (including the lens portions) of the over cladding layer. The above-mentioned molding dies were pressed so that a distance (L) from the end surfaces of the cores to the center of curvature of the spherical lens surfaces of the lens portions took values listed in Table 1 below. Then, exposure by the use of irradiation with ultraviolet light at 2000 mJ/cm² was performed through the above-mentioned molding dies. Thereafter, a heating treatment was performed at 120° C. for 15 minutes. Thereafter, the molding dies were removed. This provided the over cladding layer formed with the lens portions. The thickness of this over cladding layer was 1000 μm when measured under a microscope (manufactured by Keyence Corporation). The refractive index of this over cladding layer at a wavelength of 830 nm was 1.542.

TABLE 1

| | Core End to Center of Curvature L (μm) | Radius of Curvature R (μm) | Cores Width (μm) × Height (μm) |
|---|---|---|---|
| Example 1 | 1100 | 410 | 15 × 15 |
| Example 2 | 2800 | 1000 | 50 × 50 |
| Example 3 | 19000 | 6500 | 100 × 100 |

Then, the resultant structure was cut together with the above-mentioned PEN film into two L-shaped optical waveguide portions by punching using a blade. This provided the two L-shaped optical waveguide portions (having outside dimensions of 66.3 mm×70.0 mm and a width of 10 mm) with the PEN film.

Evaluation

The two obtained L-shaped optical waveguide portions with the PEN film were opposed to each other on the surface of a glass epoxy board, and placed to define a rectangular frame. Then, alignment was performed using a microscope so that the optical axes of the light-emitting cores and the light-receiving cores in face-to-face relationship with each other were coincident with each other. Then, a VCSEL (manufactured by Optowell Co., Ltd.) emitting light beams with a wavelength of 850 nm as a light-emitting element was coupled to a predetermined portion provided at an outer end edge of the light-emitting L-shaped optical waveguide portion with an ultraviolet curable adhesive. Also, a CMOS linear sensor array (manufactured by TAOS Inc.) as a light-receiving element was coupled to a predetermined portion provided at an outer end edge of the light-receiving L-shaped optical waveguide portion with an ultraviolet curable adhesive. Then, a controller for the above-mentioned light-receiving element was connected through a flexible printed board to a USB-type import unit (manufactured by National Instruments Corporation), and was further connected through a USB port to a computer. Then, light beams (with a wavelength of 850 nm) with an intensity of 2 mW were emitted from the above-mentioned light-emitting element, and evaluations of operation as a touch panel were performed.

As a result, in Examples 1 to 3 described above, it was found the light beams emitted from the above-mentioned light-emitting element passed through the light-emitting L-shaped optical waveguide portion, traveled in a lattice form across a coordinate input area, thereafter passed through the light-receiving L-shaped optical waveguide portion, and finally reached the above-mentioned light-receiving element. Further, when the above-mentioned coordinate input area was touched with a finger, coordinates appeared on a computer screen, and the ability to operate as a touch panel was recognized.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a touch panel, comprising:
  a body made of an under cladding material or a metal material;
  cores formed on a predetermined portion of a surface of the body; and
  an over cladding layer formed on the surface of the body so as to cover the cores,
  the optical waveguide being provided along a peripheral portion of a display screen of a display of the touch panel,
  the cores including a light-emitting core for emitting light beams and having an end surface positioned in a first side portion of the display screen of said display,
  another end surface of each of the cores is formed as a non-lens portion,
  said over cladding layer having an edge portion formed so as to cover the end surface of said light-emitting core and having the bottom surface positioned on the same level as the surface of the body on which cores are formed,
  the edge portion of the over cladding layer being formed as a lens portion by press molding,
  the lens portion having a lens surface of a spherical configuration.

2. The optical waveguide for the touch panel according to claim 1, wherein:
  the cores include a light-receiving core for receiving said emitted light beams and having an end surface positioned in a second side portion of the display screen of said display;
  another end surface of each of the cores is formed as a non-lens portion,
  said over cladding layer has a second edge portion formed so as to cover the end surface of said light-receiving core and has the bottom surface positioned on the same level as the surface of the body on which cores are formed;
  the second edge portion of the over cladding layer is formed as a second lens portion by press molding; and
  the second lens portion has a second lens surface of a spherical configuration.

3. A touch panel comprising:
  a display including a display screen and
  an optical waveguide including
  a body made of an under cladding material or a metal material;
  cores formed on a predetermined portion of a surface of the body; and
  an over cladding layer formed on the surface of said body so as to cover the cores,
  the optical waveguide being provided along a peripheral portion of the display screen of said display of the touch panel,
  the cores including a light-emitting core for emitting light beams and having an end surface positioned in a first side portion of the display screen of said display, wherein another end surface of each of the cores is formed as a non-lens portion,
  said over cladding layer having an edge portion formed so as to cover the end surface of said light-emitting core and having the bottom surface positioned on the same level as the surface of the body on which cores are formed,
  the edge portion of the over cladding layer being formed as a lens portion by press molding,
  the lens portion having a lens surface of a spherical configuration.

* * * * *